United States Patent [19]

Yatabe et al.

[11] 3,833,759

[45] Sept. 3, 1974

[54] ELECTRONIC SYSTEM FOR DISPLAYING ARTIFICALLY PRODUCED ENVIRONMENT PATTERNS

[75] Inventors: Teruo Yatabe; Shuntetsu Matsumoto, both of Tokyo, Japan

[73] Assignee: Agency of Industrial Science and Technology, Tokyo, Japan

[22] Filed: July 24, 1972

[21] Appl. No.: 274,254

[30] Foreign Application Priority Data

Nov. 22, 1971 Japan ................................ 46-93879

[52] U.S. Cl. ............... 178/6.8, 178/DIG. 35, 35/11, 35/12 N

[51] Int. Cl. ........................... G09b 9/04, H04n 7/18

[58] Field of Search .......... 178/6.8, DIG. 35; 35/11, 35/12 N

[56] References Cited

UNITED STATES PATENTS

| | | | |
|---|---|---|---|
| 3,591,931 | 7/1971 | Schuster | 35/11 |
| 3,604,848 | 9/1971 | Driskell | 35/11 |
| 3,621,131 | 11/1971 | Wolff | 35/11 |
| 3,694,558 | 9/1972 | Eisenberg | 35/12 N |
| 3,720,007 | 3/1973 | McKechnie | 35/12 N |

*Primary Examiner*—Howard W. Britton
*Attorney, Agent, or Firm*—Kurt Kelman

[57] ABSTRACT

The display system of the present invention produces simplified environment patterns and these simplified patterns are projected on a screen which is assumed to be located a certain distance to the front of the moving body by converting the *x-y* coordinate of the projected patterns to voltage values, applying these voltage values to an analog electronic circuit constructed in accordance with the equations of the patterns, converting the output electric signals of the analog electronic circuit to electric signals having widths corresponding to the spatial regions, controlling respective color signal generators in proportion to the time widths so that the color signal generators generate color signals corresponding to the color distribution of the environment patterns and producing the environment patterns on a color TV monitor screen by feeding the color signals to the color TV monitor.

9 Claims, 31 Drawing Figures

ELECTRONIC SYSTEM FOR DISPLAYING ARTIFICALLY PRODUCED ENVIRONMENT PATTERNS

Figure 1:
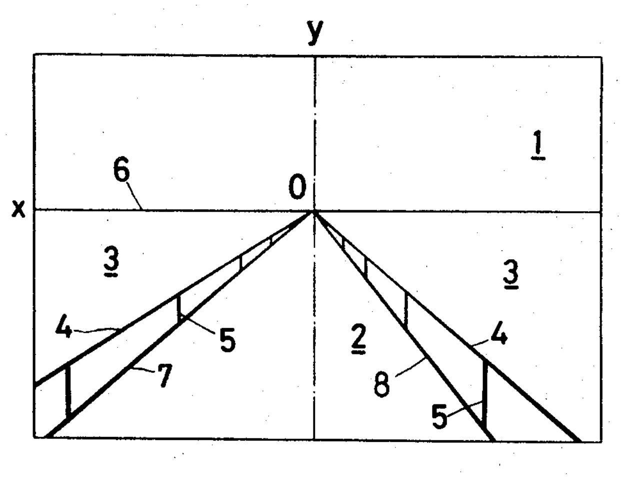

The present invention relates to an electronic system for displaying artificially produced environment patterns and, particularly to an electronic system for displaying artificially produced environment patterns which is suitable for use in the visual display device of an automobile simulator, air craft simulator, etc.

One of the main factors determining the quality of a simulator is its visual display device. Visual display devices heretofore used include a model-television camera-television monitor system in which a television camera shoots the road-pattern from a model and a picture corresponding to the road-pattern is reproduced on the television monitor and a line-picture producing system using a monochromatic television monitor in which a simple analog circuit is combined with a monochromatic television receiver to draw a white geometrical line representating a road on the TV screen. Although the former system gives a feeling of reality, it requires large sized devices and has a high fabrication cost. The latter system, on the other hand, is compact and inexpensive but lacks in reality.

A primary object of the present invention is to provide a display system for artificially produced environment patterns which can readily compose and display the variations in the environment patterns due to complicated changes in the attitude and velocity of a moving body such as automobile, airplane, etc. and thus is suitable for use as simulator of these moving bodies.

Another object of the present invention is to provide a display system for artificially produced environment patterns which provides a feeling reality using a compact and very inexpensive device compared with the conventional devices.

Another object of the present invention is to provide a display system for artificially produced environment patterns which employs no mechanical elements but only I.C. elements.

Another object of the present invention is to provide a display system for artificially produced environment patterns which can display them completely in color.

Still another object of the present invention is to provide a display system for artificially produced environment patterns which can modify and display the environment patterns spontaneously and continuously in accordance with the motion of the moving body.

That is, the display system of the present invention produces environment patterns of a degree of simplicity which does not destroy their ability to give the operator the feeling of a real experience and these simplified patterns are projected on a screen which is assumed to be located a certain distance to the front of the moving body by converting the *x-y* coordinate of the projected pattern voltage values as a function of time on the basis of horizontal and vertical synchronizing signals, applying the voltage values to an analog electronic circuit constructed in accordance with the equations of the patterns under the simplified conditions, converting the output electric signals of the analog electronic circuit to electric signals having widths corresponding to the spatial regions, controlling respective color signal generators in proportion to the time widths so that the color signals generate color signals corresponding to the color distributions of the environment patterns, producing the environment patterns on a color TV monitor screen by feeding the color signals to the color TV monitor, and simultaneously controlling the parameters of the analog circuit in accordance with the velocity and lateral deviation of the moving body to convert the *x-y* coordinate in accordance with the variation of attitude of the moving body.

Accordingly, since the present display system does not use any mechanical elements, there is no possibility of breakdowns occuring because of the failure of mechanical elements and, since it is readily possible to reproduce, in color, the conditions of fog or dusk, the operator can obtain a feeling more precisely approximating that of an actual on-the-spot experience than can be had by the conventional display system.

Figure 2:
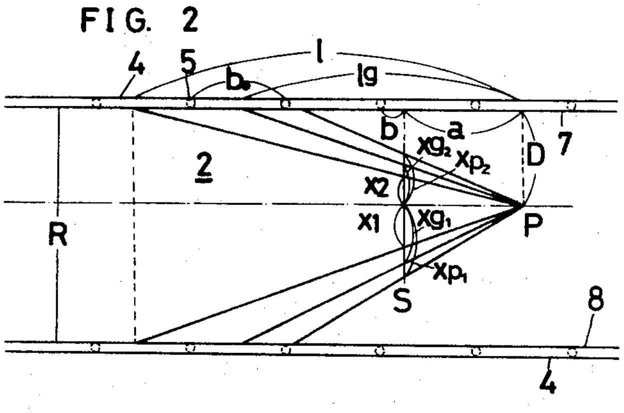
Figure 3:
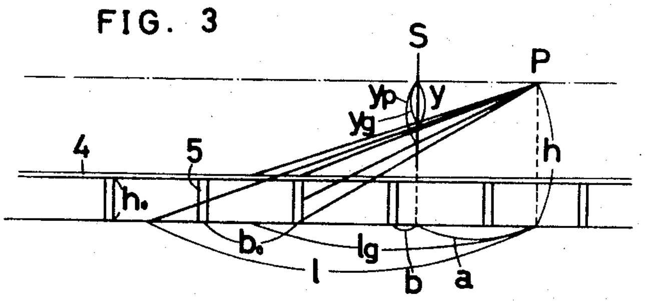
Figure 4A:
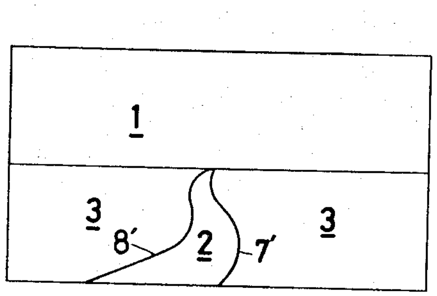
Figure 4B:
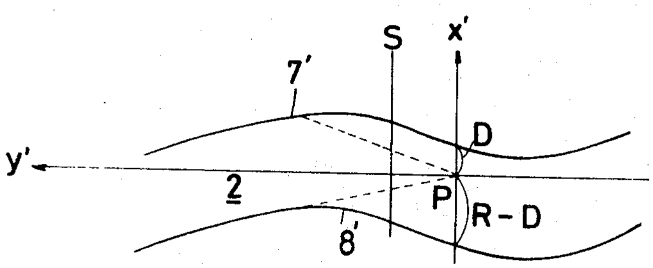
Figure 5:
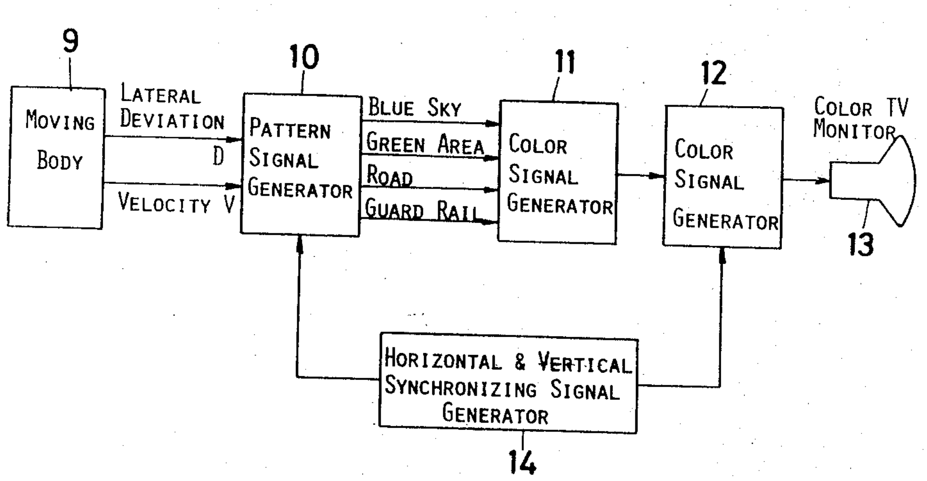
Figure 6:
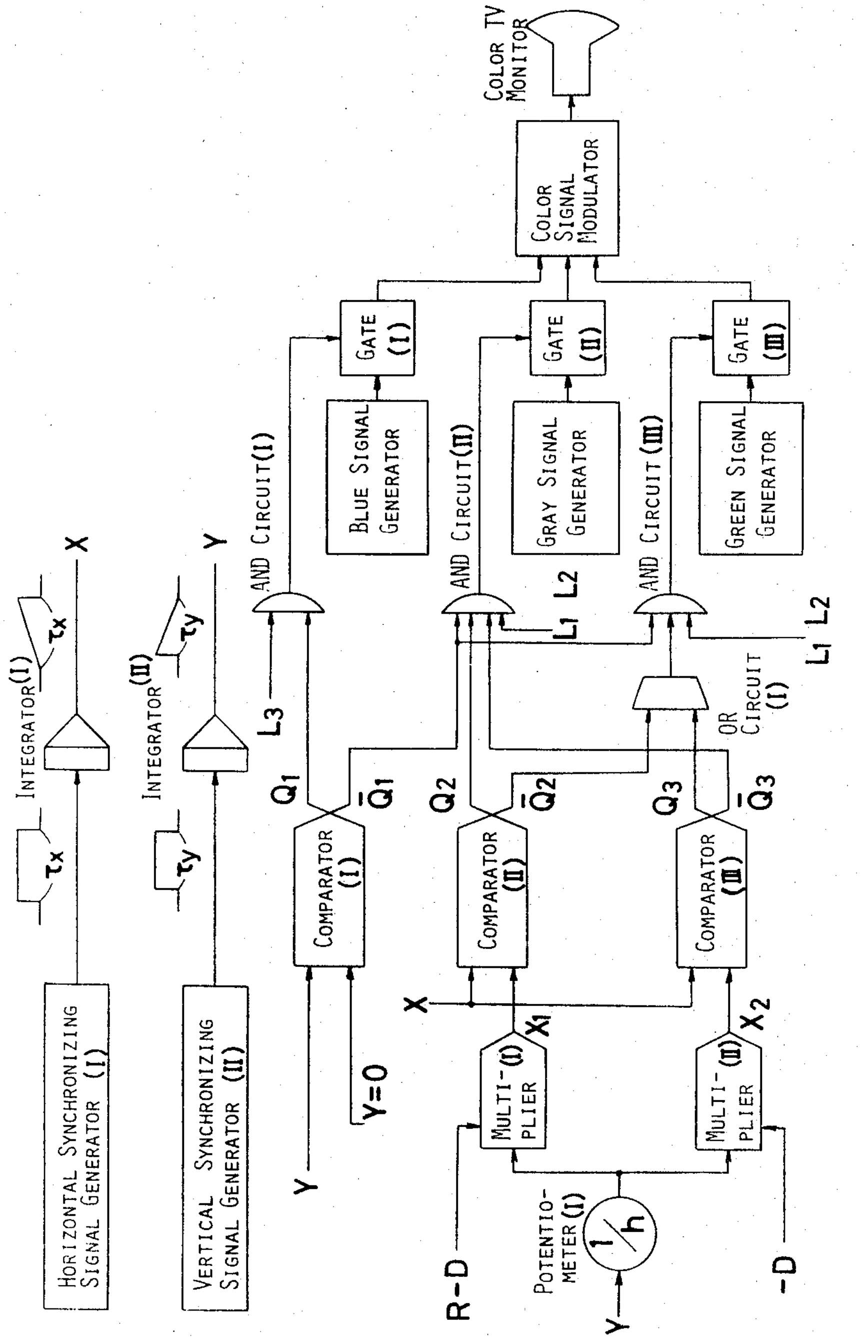
Figure 7:
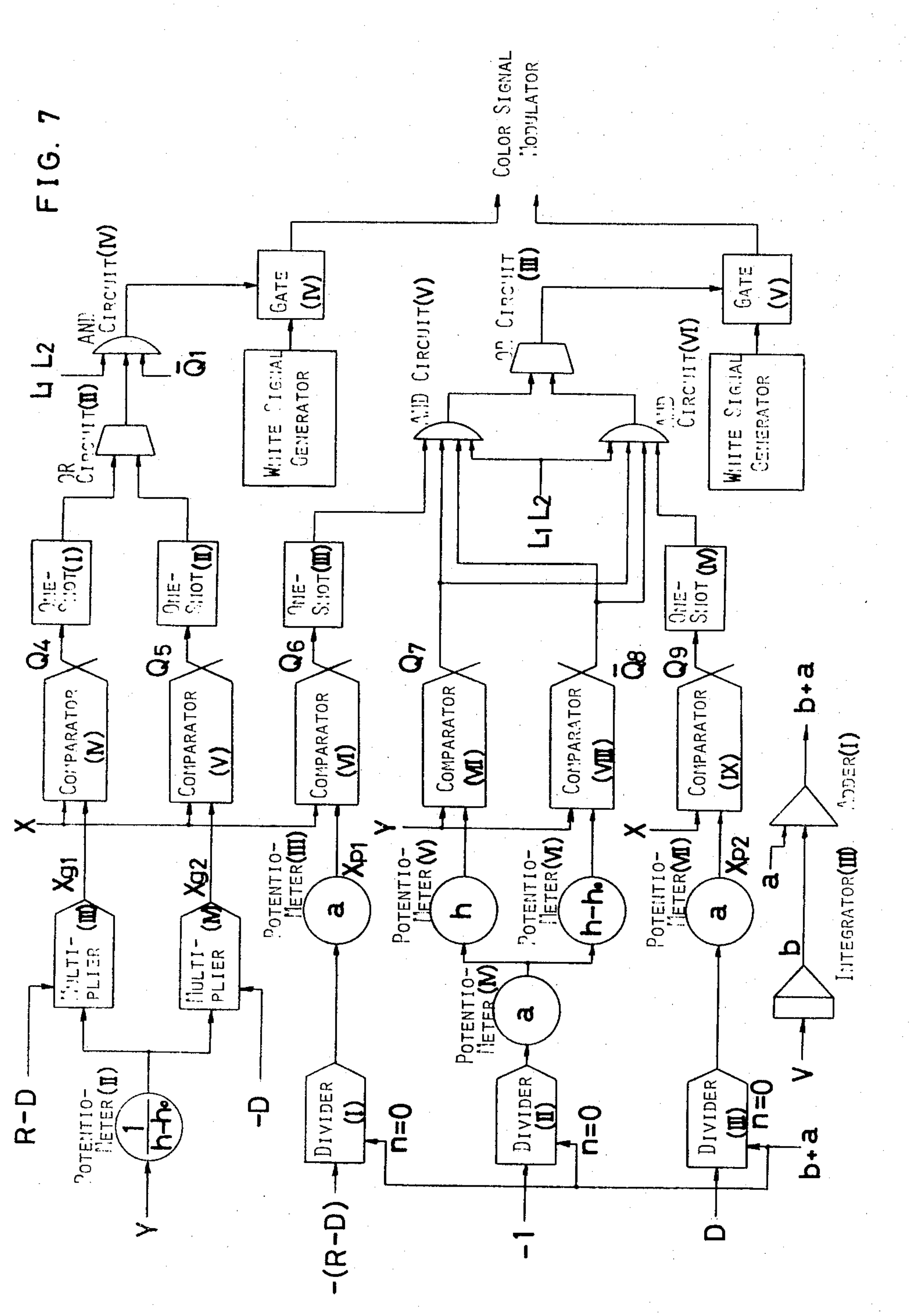
Figures 8, 10:
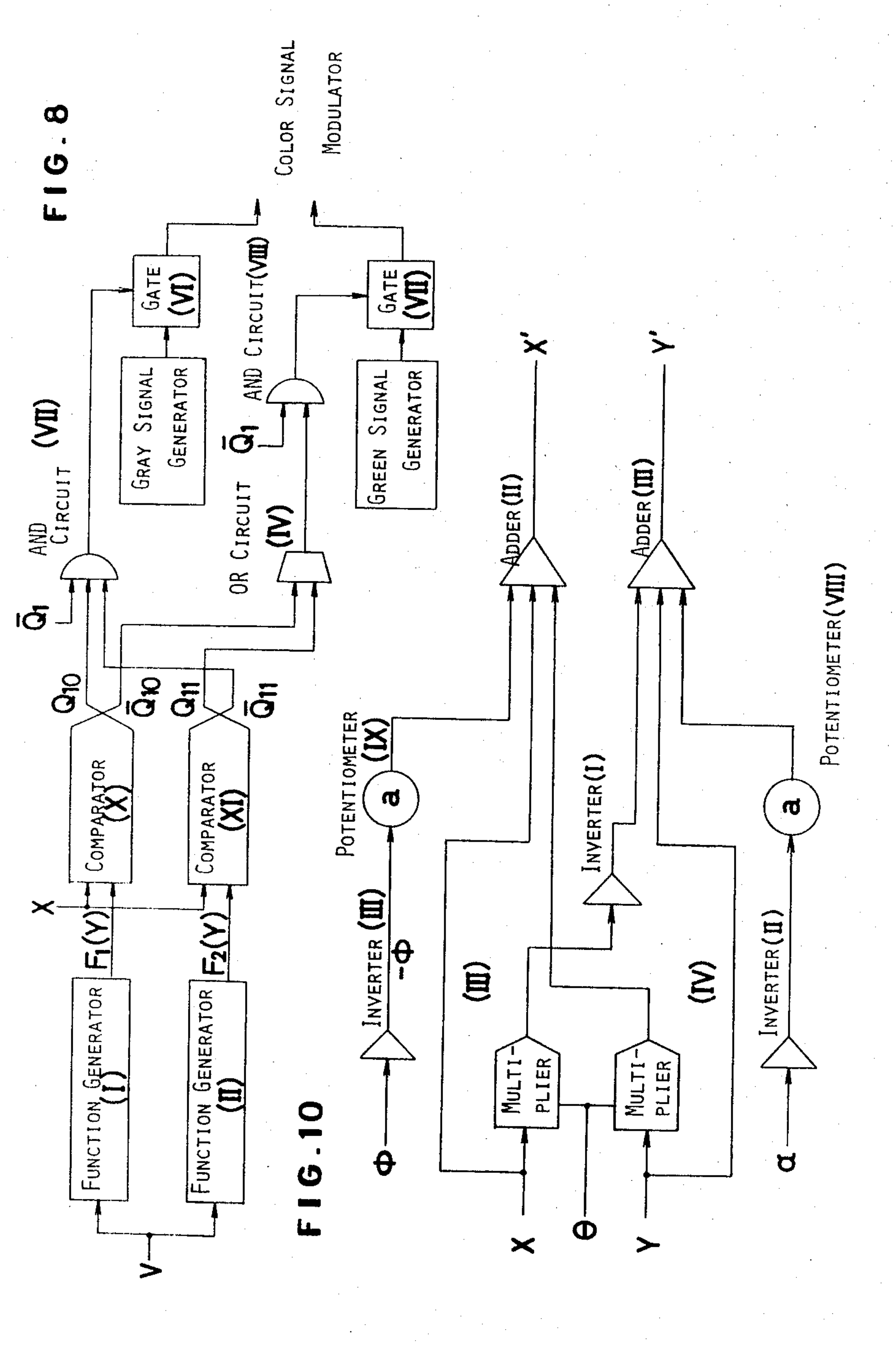
Figure 9A:
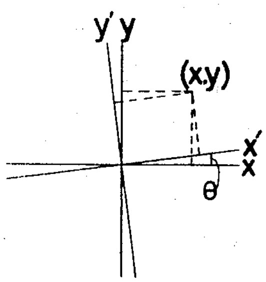
Figure 9B:
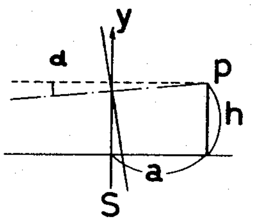
Figure 9C:
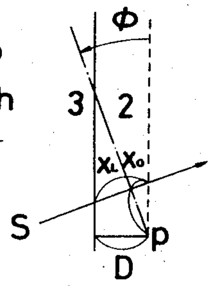
Figure 11A:
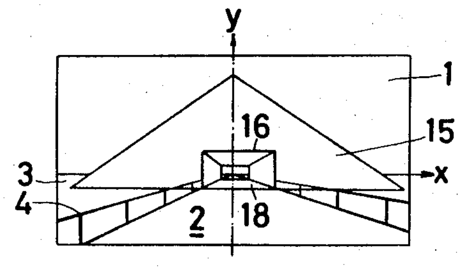
Figure 11B:
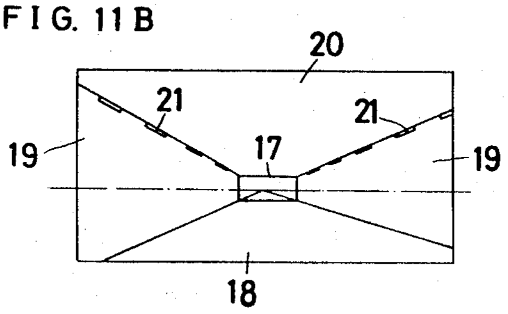
Figure 11C:
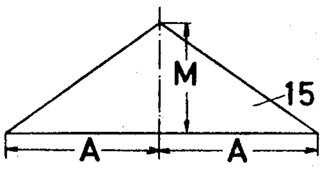
Figure 15:
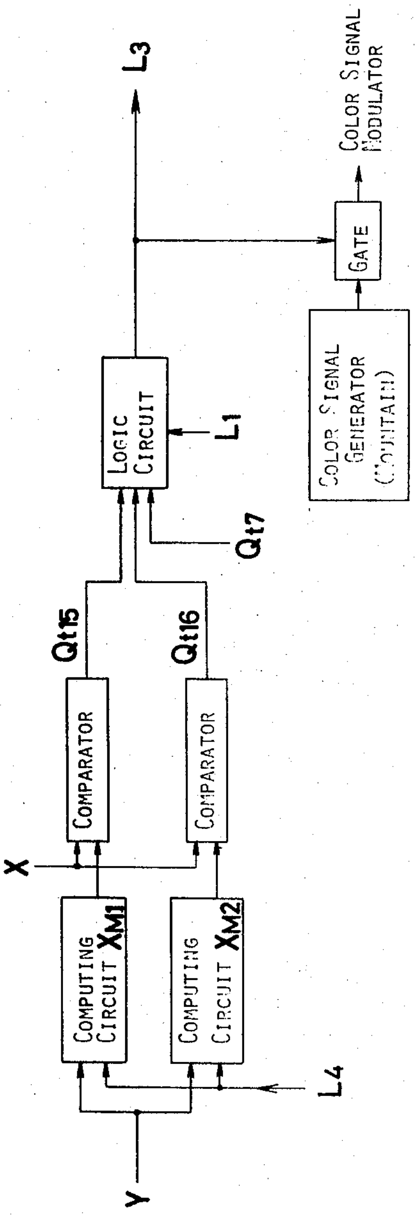
Figure 16A:
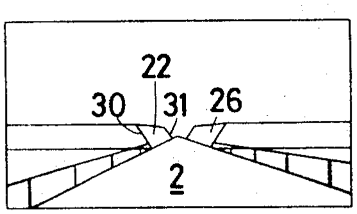
Figure 16B:
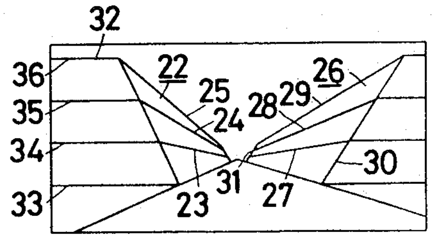
Figure 17:
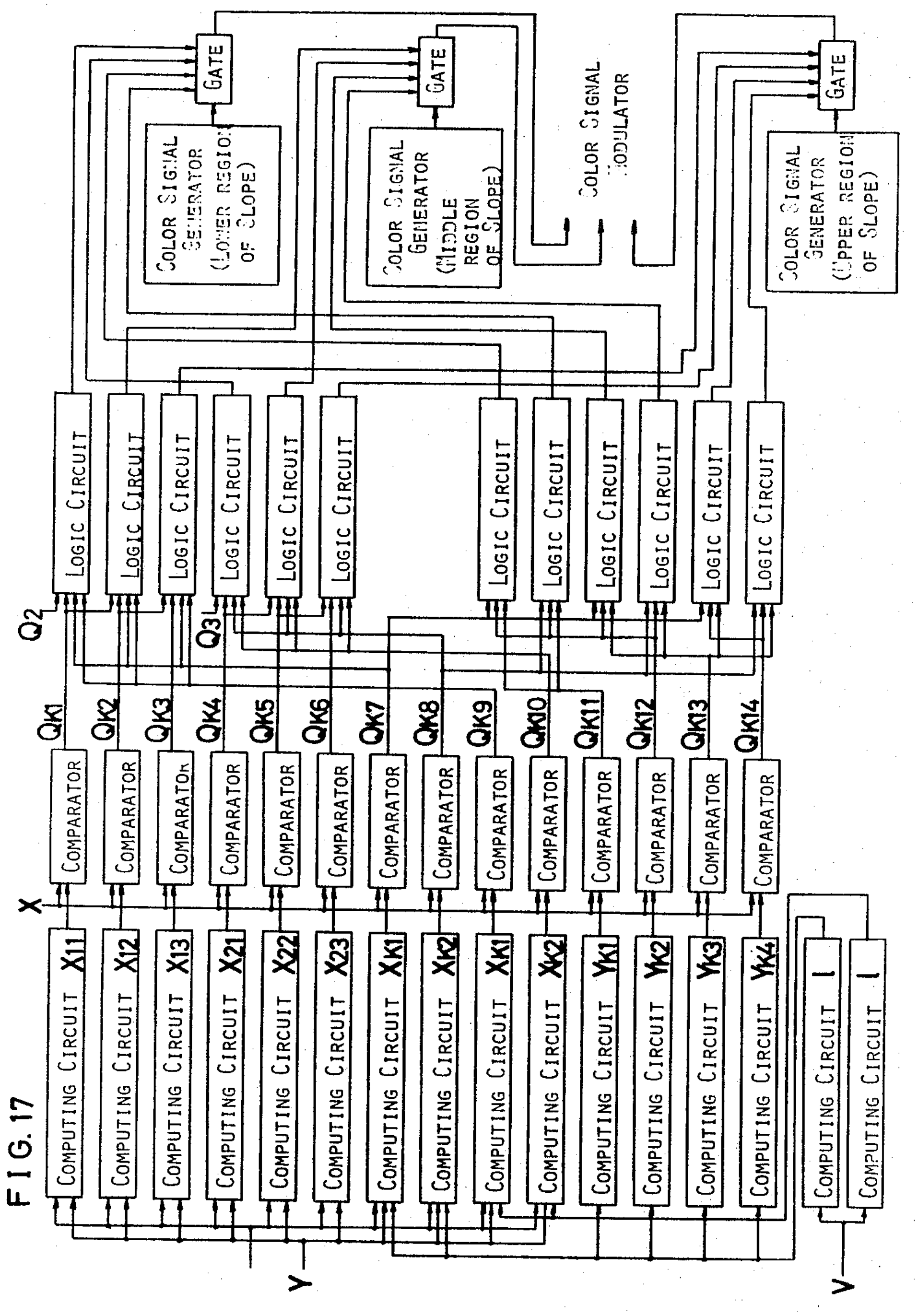
Figure 20:
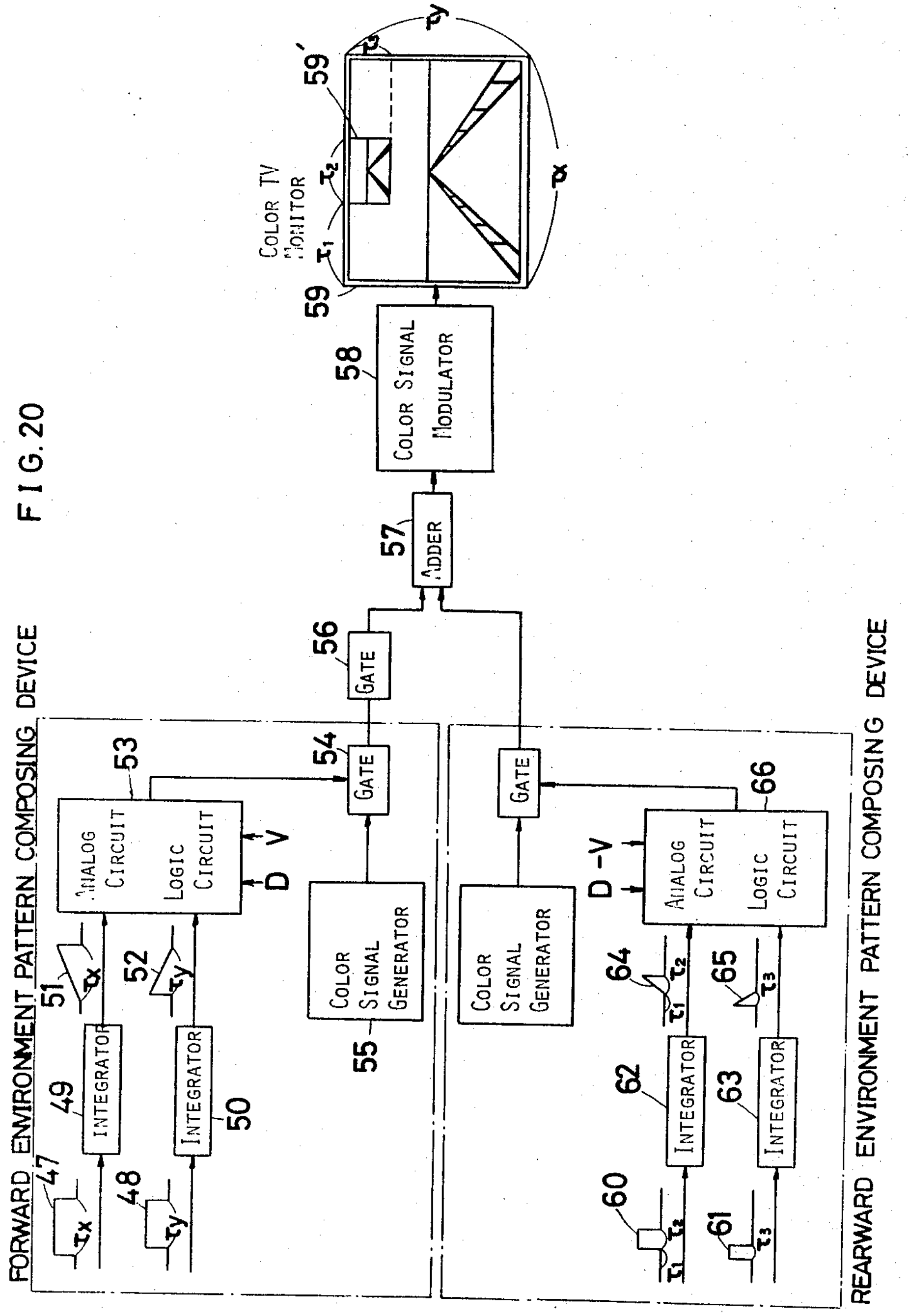
Figure 21:
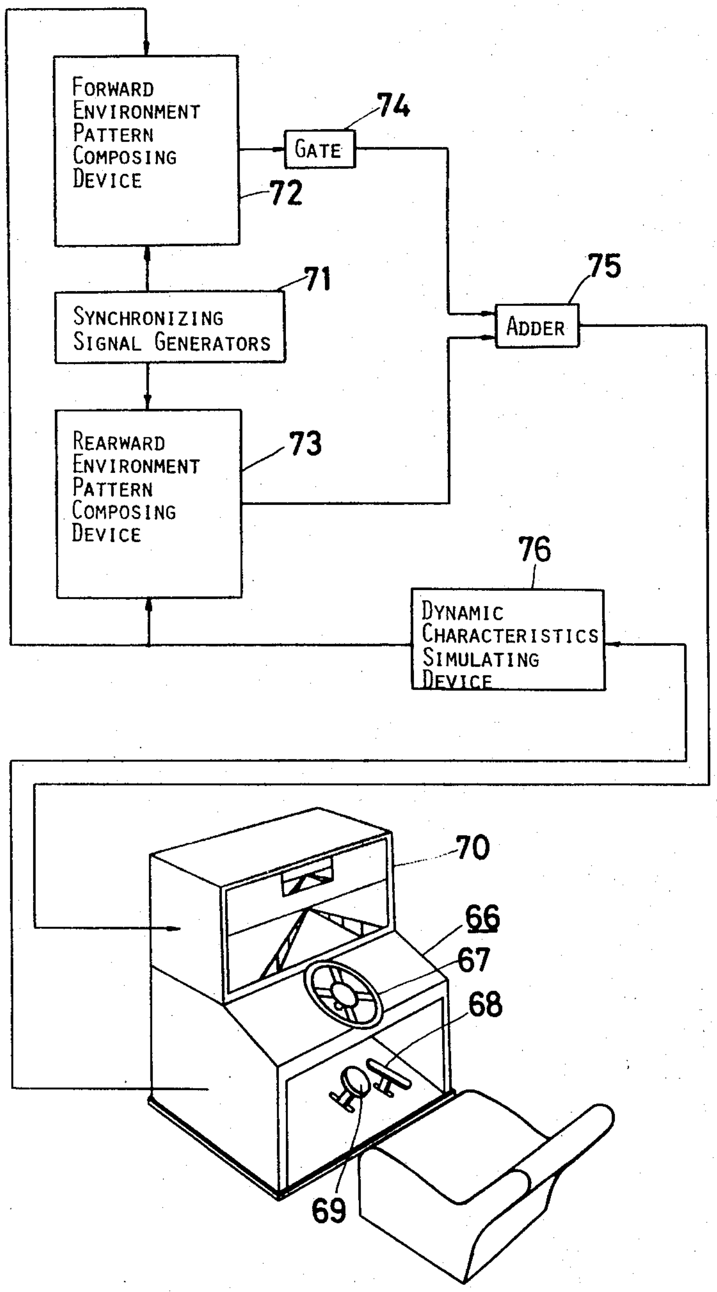
Figure 22:
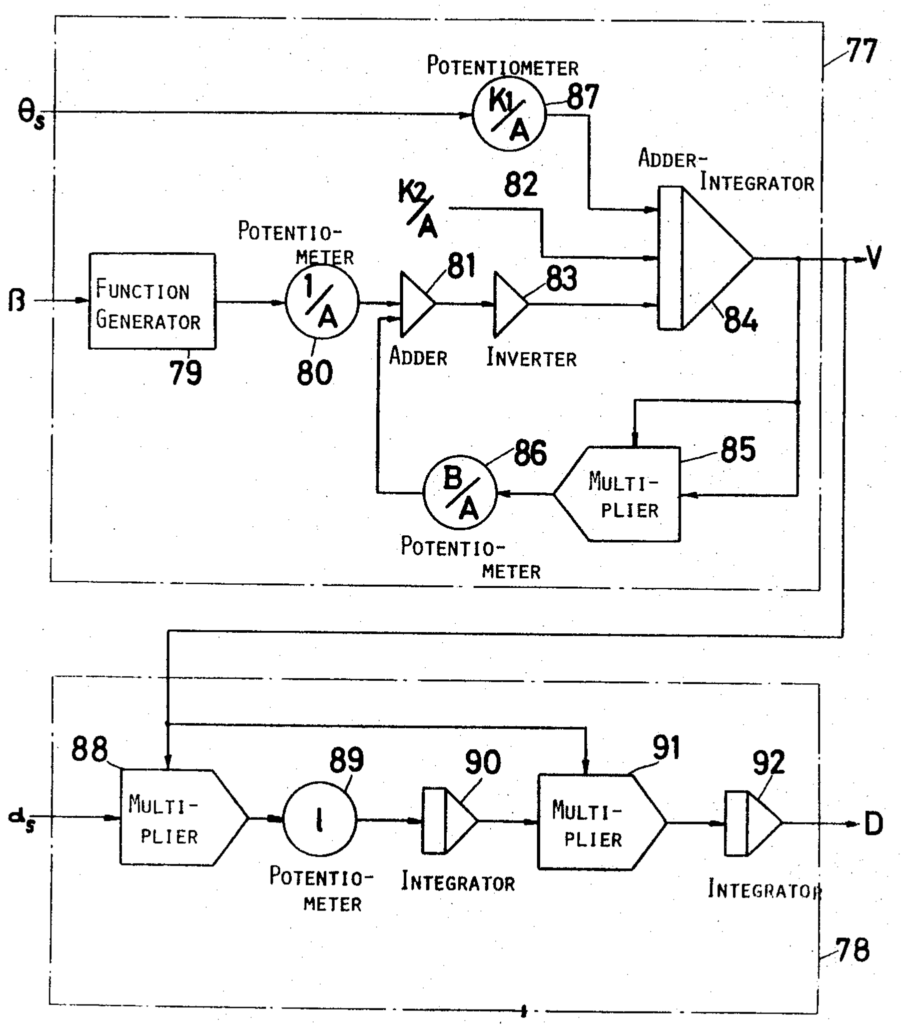

Other objects and features of the present invention will be described in detail with reference to the attached drawings, in which;

FIG. 1 is an explanatory view of an example of an environment pattern;

FIG. 2 is a plane view of a road for explaining the method for obtaining the equations representative of the boundary lines of the patterns regions, FIG. 3 is a side view of the road condition in FIG. 2, FIG. 4(A) is an explanatory view for showing an environment pattern which includes a curved road, FIG. 4(B) is a plane view of the road condition in FIG. 4(A), FIG. 5 is a schematic block diagram of an embodiment of the present system, FIG. 6 is a block diagram of a circuit of the present invention for displaying the blue sky, the road and the green area regions, FIG. 7 is a block diagram of a circuit of the present invention for displaying the guard rails of the road, FIG. 8 is a block diagram of a circuit of the present invention for displaying a curved road, FIGS. 9A, 9B and 9C are explanatory views showing a method of coordinate transformation in accordance with changes of attitudes of the moving body, FIG. 10 is a block diagram of a circuit of the present invention for performing coordinate transformation, FIGS. 11A, 11B and 11C show explanatory views of an example of tunnel pattern, FIGS. 12, 13, 14A, 14B and 15 show block circuit diagrams of the present invention for displaying a tunnel, FIGS. 16A and 16B show explanatory views of an example of cut-through road pattern, FIG. 17 is a block diagram of a circuit of the present invention for displaying a cut-through road, FIGS. 18A, 18B, 19A and 19B are explanatory views of entrance and exit ramps, respectively, FIG. 20 is a block diagram of a circuit of the present invention for displaying the road pattern to the rear, FIG. 21 is an explanatory view for applying the present system to an automobile simulator, and FIG. 22 is a block diagram of a circuit for simulating the dynamic characteristics of an automobile.

The environment patterns as seen from a moving body are various and complicated and it is almost impossible to perfectly reproduce them by artificial means using digital and/or analog operational circuits. Therefore, it is ordinary to simplify them to the degree to which simplification is possible without loss of a feeling of reality. For example, with the patterns sensed by something having a sense of vision as, for example, the driver's eyes, aboard a moving body such as an automobile moving along a road provided on both sides with guard rails, the pattern can be simplified by dividing it, as shown in FIG. 1, into colored regions defined by straight or curved lines such as the blue sky 1, gray road 2, green areas 3 extending outwardly from both sides of the road 2, guard rails 4 defined by white lines along both sides of the road 2 and supporting posts 5 therefor etc. It is now assumed that the pattern thus simplified is projected onto a screen S (hereinafter, referred to as "imaginary screen") which is assumed to be located at a position forward by a distance $a$ from the point of vision P on the moving body, as shown in FIGS. 2 and 3.

In producing the pattern projected onto the imaginary screen S on a color TV monitor, equations of boundary lines which define the chromatic regions of the pattern on the imaginary screen S are first defined. As the origin 0 of the $x$-$y$ coordinates on the screen S, a point which corresponds to a point infinitely forward from the moving body is chosen and a line on the screen which corresponds to the forward horizon 6 defines the $x$ axis on coordinate and a vertical line intersecting with the x axis at the origin 0 defines the $y$ axis.

The boundary line between the blue sky and other regions is the horizon 6 and thus the equation of the linear boundary line on the imaginary screen corresponding to the horizon 6 becomes as follows:

$$y = 0 \tag{1}$$

The equation of straight lines on the imaginary screen which correspond to boundary lines 7 and 8 between the road 2 and the green areas 3 can be defined from FIGS. 2 and 3 as follows:

the left side line 7 of the road $$x = x_1 = [(R - D)/h]y \tag{2}$$

the right side line 8 of the road $$x = x_2 = (-D/h)y \tag{3}$$

where $x_1$ and $x_2$ are $x$-coordinate values on the imaginary screen when portions of the left and right boundary lines 8 and 7 at a certain distance $l$ forwardly of the point of vision P are projected onto the imaginary screen, respectively, $h$ is the height of vision with respect to the road surface, $R$ is the width of the road and $D$ is the distance between the right side edge or shoulder of the road and the point of vision of the moving body, and, by controlling the latter by means of the steering wheel of the automobile simulator, the variation of the projected pattern on the imaginary screen due to the lateral shift or deviation of the moving body on the road can be displayed on the color TV monitor screen.

Accordingly, the chromatic regions of the pattern on the imaginary screen become as follows;

| | | | |
|---|---|---|---|
| blue sky region | | $Y > 0$ | (4) |
| road region | $x_1 < x < x_2$ | y 0 | (5) |
| boundary line dividing the road and the green area | $x = x_1, x = x_2$ | y 0 | (6) |
| green areas | $x < x_1$, or $x > x_2$ | y 0 | (7) |

On the other hand, it is assumed that the left side boundary line 7' and the right side boundary line 8' between the road and the green areas extend along curves as shown in FIG. 4 expressed not by the equations 2 and 3 but by the following equations, respectively, $$x' = g_1(y') - (R - D) \tag{I}$$

where $g_1(y')$ is a multinominal expression of $y'$ and $g_1(y') = a_1y' + a_2y'^2 + a_3y'^3$ and $$x' = g_2(y') + D \tag{II}$$

where $g_2(y')$ is a multinominal expression of $y'$ and $g_2(y') = a_1y' + a_2y'^2 + a_3{}'^3 + \ldots$ In this case, the pattern of the curved road to be projected onto the imaginary screen in expressed, by using a similar method to that previously mentioned, as follows:

the left side line 8' of the road $$x = f_1(y) = -(y/h)\,[g_1(-ah/y) - (R - D)]\ y < 0 \tag{2'}$$

the right side line 7' of the road $$x = f_2(y) = -y/h\,[g_2(-ah/y) + D]\ y < 0 \tag{3'}$$

Accordingly, the road area becomes $$f_1(y) < x < f_2(y)\ y < 0 \tag{5'}$$

rather than equation 5 and the green areas become $$x < f_1(y) \text{ or } x > f_2(y)\ y < 0 \tag{6'}$$

rather than equation 6. The D in the equations 2 and 3 is the distance between the moving body and the right side shoulder of the road, and, by controlling the distance D, the variation on the imaginary screen due to the lateral deviation of the moving body can be displayed on the color TV monitor screen.

The equations of straight lines on the imaginary screen which correspond to the upper edge of the guard rails 4 can be expressed, from FIGS. 2 and 3, as follows:

the left side of the guard rail $$x = x_{01} = [(R - D)/(h - h_o)]y \leqslant 0 \tag{8}$$

the right side of the guard rail $$x = x_{g2} = [-D/(h-h_o)]y \leqslant 0 \quad (9)$$

where $x_{g1}$ is $X$-coordinate value on the imaginary screen representing a point on upper edge of the left guard rail remote forwardly from the point of vision P by $lg$ and $x_{g2}$ is the value on the $x$-coordinates representing a point on the upper edge of the right guard rail at the same forward distance, and $h_o$ represents the height of the upper edges of the guard rails with respect to the road surface.

Assuming that the posts 5 for the guard rails 4 are arranged regularly along the road 2 at a fixed interval $b_o$, the equation of the line segment on the imaginary screen which corresponds to the $n$th post of the guard rail, counting from one closest to the imaginary screen, can be represented as follows:

the left side of the post $$x = x_{p1} = \{-a/[(n-1)b_o + b + a]\}(R-D) \quad (10)$$

$$\{-a/[(n-1)b_o + b + a]\}h \leqslant y_{p1} \leqslant \{-a/[(n-1)b_o + b + a]\}(h-h_o) \quad (11)$$

the right side of the post $$x = x_{p2} = \{a/[(n-1)b_o + b + a]\}D \quad (12)$$

$$\{-a/[(n-1)b_o + b + a]\}h \leqslant y_{p2} \leqslant \{-a/[(n-1)b_o + b + a]\}(h-h_o) \quad (13)$$

where $x_{p1}$ and $y_{p1}$ are $x$-$y$ coordinates values when the position of the post of the left guard rail remotely forward from the point of vision P by $l = (n\text{-}1)b + b_o + a$, ($n = 1, 2, \ldots$) is projected onto the imaginary screen and $x_{p2}$ and $y_{p2}$ are those when the right post at the same distance is projected.

Where the road 2 is straight, the variation of the projected pattern on the imaginary screen appears as the movement of the post of the guard rails when the moving body moves along the road at velocity V. Since, among the parameters in equations 10 through 13, only $b$ which corresponds to the distance between the imaginary screen S and the nearest post thereto changes with the movement of the moving body, the change of the projected pattern on the imaginary screen due to the movement of the body along the road at velocity V can be displayed on a color TV monitor screen by putting $b = \int Vdt$ and periodically changing $b$ within the range $0 \leqslant b \leqslant b_o$ with time $t$.

An example of a device for displaying on a color TV monitor screen the environment patterns expressed by equations in the manner previously described will be explained with reference to FIGS. 5, 6 and 7.

In displaying the environment pattern expressed by the equations on the color TV monitor screen, the $x$-$y$ coordinates on the imaginary screen must be converted to the time width with reference to the synchronizing signal because in television the space coordinates is converted to a function of time using the scanning system and displayed thereby. For the scanning of the pattern on the imaginary screen such as shown in FIG. 1, the horizontal scanning in made about the x-coordinate in the direction from minus to plus and the vertical scanning about the y-coordinate in the direction from plus to minus.

As shown in FIG. 5, the conditions of motion (lateral deviation D and velocity V) of the moving body 9 are fed to a environment pattern signal generator 10, which includes analog electronic circuits and logic circuits combined in accordance with the aforementioned equations of the pattern, and converted to time widths of electric signals corresponding to the spatial regions and in synchronism with the horizontal and vertical synchronizing signals from a synchronizing generator 14 to control the color signal generators 11 in proportion to the time width, and by supplying the color signals to a color signal modulator 12 and then to the color TV monitor 13, the environment pattern is displayed on the TV monitor screen.

A method for composing and displaying, blue sky, road, and green area will be described in detail with reference to FIG. 6.

Firstly the $x$-$y$ coordinates values on the imaginary screen S carrying thereon the projected environment pattern are converted to voltage values as a time function of tooth wave by, for $x$-coordinate value, applying a square wave synchronized with the horizontal synchronizing signal to an integrator (I) and by, for $y$-coordinate value, applying a square wave synchronized with the vertical synchronizing signal to another integrator (II), and the voltage values are supplied to the analog electronic circuit constructed, as shown and described, in accordance with the equations of the environment pattern.

"$\tau_x$" in the figures shows the scanning time from left to right, and "$\tau_y$" shows the scanning time from top to bottom of the color TV screen.

For the blue sky region, the output signal Y from the integrator II is compared with $y = 0$ in a comparator I in accordance with the equation 4. When the result of the comparison shows $y > 0$, the output $Q_1$ from the comparator I is an electric signal having width corresponding to the blue sky region and when the result of the comparison shows $y < 0$, the output $\overline{Q}_1$ is an electric signal representing the region below the horizon and a gate (I) is controlled through the logical product circuit (I) by output $Q_1$ to pass the output signal of a blue signal generator to the color signal modulator to thereby display the blue sky region on the color TV monitor screen.

The regions of the road 2 and the green areas 3 are produced in the following manner. The output signal Y of the integrator (II) is multiplied with $1/h$ by a potentiometer (I) according to the equation 2 and further multiplied with the lateral deviation $(R - D)$ which is one of the moving conditions of the moving body in a multiplier (I) to thereby obtain an electric signal $X_1$ corresponding to $x_1$, the signal $X_1$ is compared with the output signal X of the integrator (I) in a comparator (II). When $X_1 > X$, an electric signal is provided on the output $\overline{Q}_2$ of the comparator (II) and when $X_1 < X$, an electric signal is provided on the output $Q_2$ of the same. On the one hand, $X_2$ is obtained by multiplying the lateral deviation $-D$ which is the distance between the moving body and the right side edge of the road and the other moving condition of the moving body, with $1/h \cdot Y$ in a multiplier (II) according to the equation 3 and the $X_2$ is compared with the output signal X of the integrator (I) in a comparator (III). When $X_2 > X$, an electric signal is produced at the output $\overline{Q}_3$ of the comparator (III) and when $X_2 < X$, an electric signal is produced at the output $Q_3$ of the same. Since the electric signal having width corresponding to the road region expressed by the equation 5 is obtained by providing the logical product of the signals at the outputs $Q_2$ and $\overline{Q}_3$ using a logical product circuit (II), the output of the logical product circuit (II) opens a gate (II) to control the output signal of a gray signal generator for sending the signal to the color signal modulator to thereby produce the road region on the color TV monitor. Simultaneously, the logical sum of the signals at the outputs $\overline{Q}_2$ and $Q_3$ is obtained in a logical sum circuit (I). Further, the logical product of the output signal of the logical sum circuit (I) and the output signal $\overline{Q}_1$ of the comparator (I) is obtained a logical product circuit (III) whereby an electric signal having width corresponding to the green regions expressed by the equation 7 is obtained. The output signal of the logical product circuit (III) opens a gate (III) to control the signal from the green signal generator to thereby send it to the color signal modulator for producing the green regions on the color TV monitor. At this time when the lateral deviation (R − D) and −D of the moving body which are supplied to the multipliers (I) and (II) are controlled, the variation of the pattern on the imaginary screen due to the lateral deviation of the moving body can be displayed on the color TV monitor screen.

On the other hand, as shown in FIG. 7, for the upper edge of the left guard rail, the output signal Y of the integrator (II) is multiplied with $1/(h - h_o)$ by a potentiometer (II) according to the equation 8. The result is further multiplied with the lateral deviation (R − D) of the moving body by the multiplier (III) to produce an electric signal $X_{g1}$ corresponding to $x_{g1}$ and the signal $X_{g1}$ is compared with the output signal X of the integrator (I) in a comparator (IV). When $X = X_{g1}$, an electric signal is produced at the comparator (IV) and this output $Q_4$ is used to trigger a one-shot multivibrator (I) to produce a pulse having time width corresponding to the width of the upper edge of the gard rail. This pulse is passed through the logical sum circuit (II) to the logical product circuit (IV) to obtain its product with the output $\overline{Q}_1$ of the comparator (I). The output of said logical product circuit (IV) is used to open a gate (IV) to thereby control the signal from a white signal generator so that it is fed to the color signal modulator to produce the upper edge of the left guard rail on the color TV monitor.

In a similar manner, the production of the upper edge of the right guard rail on the TV monitor is performed by multiplying, in a multiplier (IV), the output $1/(h - h_o)\cdot Y$ of the potentiometer (II) with the lateral deviation −D of the moving body according to the equation 9 to obtain an electric signal $X_{g2}$ corresponding to $x_{g2}$, comparing the signal $X_{g2}$ and the output signal X of the integrator (I) in a comparator (V) so that the comparator (V) produces the output $Q_5$ when $X = X_{g2}$, triggering a one-shot multivibrator (II) with this output $Q_5$ to produce a pulse having time width corresponding to the width of the upper edge of the guard rail. Further, the logical sum of the output signal of one-shot multivibrators (I) and (II) is obtained in the logical sum circuit (II). Then, the logical product of the output signal of this logical sum circuit (II) and the output signal $\overline{Q}_1$ of the comparator is obtained in the logical product circuit (IV). The output of said logical product circuit (IV) is used to open the gate (IV) to thereby control the signal from the white signal generator so that it is fed to the color signal modulator to produce the upper edge of the right guard rail on the color TV monitor.

In addition to this, the production of the pattern of the guard rail posts 5 on the TV monitor is performed in the following manner. Consideration is first made of the nearest post to the imaginary screen S, that is, $n = 1$. For the left post, $-(R - D)/(b + a)$ is calculated by a divider (I) according to the equation 10, the result is multiplied with $a$ in the pontentiometer (III) to obtain an electric signal $X_{p1}$ corresponding to $x_{p1}$ and the signal $X_{p1}$ is compared with the output signal X of the integrator (I) in a comparator (VI). When $X = X_{p1}$, the comparator (VI) provides an electric signal on its output $Q_6$ and the electric signal triggers the one-shot multivibrator (III) to produce a pulse having time width corresponding to the thickness of the post. However, according to the equation 12, the range of the $y$-coordinate within which the post is able to exist is limited. Accordingly, firstly $-1/(b + a)$ is then calculated by multiplying a and h with $-1/(b + a)$ using potentiometers (IV) and (V). Then, $[-ah/(b + a)]$ is compared with the output Y of the integrator (II) in a comparator (VII). When $Y \geqslant -a\cdot h/(b + a)$ the comparator (VII) provides an electric signal at its output $Q_7$. In a similar manner, $-a(h - h_o)/(b + a)$ is calculated by divider (II) and the potentiometers (IV) and (VI) and the output Y of the integrator (II) is compared with this value in the comparator (VIII). When $Y \leqslant -a(h - h_o)/(b + a)$ the comparator (VIII) provides an electric signal on its output $\overline{Q}_8$. Therefore, an electric signal corresponding to regions satisfying the equations 10 and 11 are obtained by obtaining a logical product of the output signals of the one-shot multivibrator (III), and the outputs $Q_7$ and $\overline{Q}_8$ of the comparators (VII) amd (VIII) by the logical product circuit (V). The electric signal is fed through a logical sum circuit (III) to a gate (V) to control the output signal of the white signal generator so that it is fed to the color signal modulator in FIG. 6 to produce a white post for the guard rail on the TV monitor. For the right post, an electric signal $X_{p2}$ corresponding to $x_{p2}$ is calculated similarly by a divider (III) and the potentiometer (VII) according to the equation 12 and it is compared with X in a comparator (IX). When $X = X_{p2}$, the comparator (IX) provides a signal on its output $Q_9$ and this signal triggers a one-shot multivibrator (IV) to produce a pulse having time width corresponding to the thickness of the post. When the electric signal form the output $Q_7$ of the comparator (VII) and the output $\overline{Q}_8$ of the comparator (VIII) which has time widths corresponding to the $y$-coordinate values satisfying the equation 13 (or 11) and the abovementioned pulse are fed to a logical product circuit (VI) to obtain their logical product, an electric signal corresponding to the regions satisfying the equations 12 and 13 is obtained. This electric signal opens the gate (V) through a logical sum circuit (III) to control the output signal of the white color generator so that it is fed to the color signal modulator in FIG. 6 to produce a white guard rail post on the color TV monitor.

When the signal $b + a$ which is to be inserted at this time to the dividers (I), (II) and (III) is obtained by integrating in the integrator (III) the moving velocity V of the moving body in a range $0 \leqslant b \leqslant b_o$ and adding the result with $a$ in adder (I), the variation of the pattern due to the movement of the moving body at velocity V can be displayed on the color TV monitor screen.

Furthermore, the pattern of the post nearest but one to the imaginary screen (that is, $n=2$) can be produced in the same combination of circuits as that mentioned above by substituting a division $(b_o+b+a)$ for the division $(b+a)$ to be inserted to the dividers (I), (II) and (III).

Similarly, for the posts positioned further off from the imaginary screen, their pattern can be produced on the TV monitor screen using the same combination of the circuits by putting $n = 3, 4, .....$ and replacing the division of the divider by $2b_o + b + a$, $3b_o + b + a$ ..... .

Where a pattern of a curved road is to be produced on the color TV monitor, it can be achieved by using function generators (I) and (II) such as shown in FIG. 8 instead of the potentiometer (I) and the multipliers (I) and (II) in the above-mentioned system in FIG. 6 so that an electric signal $F_1(Y)$ corresponding to the equation 2′ at the function generator (I) and an electric signal $F_2(Y)$ corresponding to the equation 3′ at the function generator (II) are produced and comparing them with the output signal X of the integrator (I) using comparators (X) and (XI). The comparator (X) produces an electric signal on its output $\overline{Q}_{10}$ when $X < F_1(Y)$ and on its output $Q_{10}$ when $X > F_1(Y)$. The comparator (XI) produces an electric signal on its output $\overline{Q}_{11}$ when $X < F_2(Y)$ and on its output $Q_{11}$ when $X > F_2(Y)$. An electric signal having time width corresponding to the region of the curved road expressed by the equation 5′ is obtained by providing a logical product of the signals on the outputs $Q_{10}$, $\overline{Q}_{11}$ and the output signal $\overline{Q}_1$ of the comparator (I) in a logical product circuit (VII) and this signal having width corresponding to the curved road region opens a gate (VI) to control the output signal of the gray signal generator so that it is fed to the color signal modulator to thereby produce the curved road region on the TV monitor. On the other hand, the logical sum of the signals on the outputs $\overline{Q}_{10}$ and $Q_{11}$ is obtained by a logical sum circuit (IV) and the product of this output and the output signal $\overline{Q}_1$ is obtained from the logical product circuit (VIII). The output of logical product circuit (VIII) is an electric signal having time width corresponding to the green regions expressed by the equation 6′. The signal thus obtained is used to open a gate (VII) to control the signal of the green signal generator so that it is fed to the color signal modulator to produce the green region on the color TV monitor.

At this time, by suitably controlling the parameters contained in the function generators (I) and (II) in accordance with the lateral deviation etc. of the moving body, the variation of the pattern projected on the imaginary screen due to the movement of the moving body can be displayed on the color TV monitor.

A case where the changes in the environmental pattern due to the changes of the attitude of the moving body is to be displayed on the color TV monitor will now be described. As changes in attitude, rolling FIG. 9(A), pitching FIG. 9(B) and yawing FIG. 9(C) or any combination thereof can be considered.

Explaining, firstly, the changes in the pattern on the imaginary screen due to rolling, rolling can be expressed by rotating the $x'$-$y'$ coordinates on the imaginary screen, which moves with the movement of the moving body, with respect to the aforementioned $x$-$y$ coordinates on the imaginary screen, which not move with respect to the road surface, by roll angle $\theta$ (radians) as shown in FIG. 9(A), and therefore it is sufficient to transform the $x$-$y$ coordinates to the $x'$-$y'$ coordinates.

This coordinate transformation is achieved by performing the following transformation.

$$x' = x\cos\theta + y\sin\theta$$
$$y' = -x\sin\theta + y\cos\theta$$

In this formation, the roll angle $\theta$ is very small and, therefore, by assuming $\theta \approx 0$, the above formation can be expressed as follows, $$\left.\begin{aligned} x' &= x + y\theta \\ y' &= -x\theta + y \end{aligned}\right\} \quad (14)$$

where $\theta$ is assumed positive when counterclockwise.

As to the pitching, since the ptich angle $\alpha$ is very small and negligible ($\alpha \approx 0$) as in the case of rolling, and, particularly, only the vertical motion of the horizon is remarkable while the changes of other portions are not so large, it is sufficient that only the vertical motion of the horizon be considered in displaying the changes in the pattern on the imaginary screen due to pitching. The pattern on the imaginary screen which corresponds to an infinitely remote from the vision is shifted in the $y$ axis direction by $y_o \approx +a{\cdot}\alpha$ as shown in FIG. 9(B), where $\alpha$ assumed positive when downward.

Accordingly, it is sufficient to shift the origin (0, 0) in parallel to (0, $a{\cdot}\alpha$) and the equation of formation becomes as follows.

$$\left.\begin{aligned} x' &= x \\ y' &= y - a{\cdot}\alpha \end{aligned}\right\} \quad (15)$$

As to the pattern changes on the imaginary screen due to yawing, the shift of the original point due to yawing is expressed from FIG. 9(C) by $x_o = a\tan\phi$ where $\phi$ is the yawing angle. Accordingly, it is sufficient to shift the original point to ($a\tan\phi$, 0) and thus the new coordinates become as follows.

$$x' = x - a\tan\phi$$
$$y' = y$$

The intersecting point of the segment line of the right side of the road and the imaginary screen is changed from (D, $h$) to (D/cos $\phi$, $h$) due to the yawing because of the relation $X_L = D/\cos\phi$. Accordingly, the equation expressing the segment line of the right side edge of the road becomes $x' = (-D/h\cos\phi)Y'$. *Assuming* $\phi \approx 0$ for simplification, $\cos\phi \approx 1$ and $\tan\phi \approx \phi$ are obtained and therefore the above equation can be simplified as $x' = (-D/h)Y'$. (see equation 2)

Therefore, it is sufficient for the pattern change due to the yawing to perform the following coordinate transformation.

$$\left.\begin{aligned} x' &= x - a\phi \\ y' &= y \end{aligned}\right\} \quad (16)$$

In order to display the above mentioned changes of the environment pattern due to the attitude changes of the moving body on the color TV monitor, it is sufficient to connect analog electronic circuits for the coordinate transformations such as shown in FIG. 10 to the output sides of the integrators (I) and (II) in FIG. 6.

In the analog circuits, the output signals X and Y of the integrators (I) and (II) are respectively multiplied by $\theta$ in multipliers (III) and (IV) and the output signals of the integrator (I) and the multiplier (IV) are supplied to an adder (II) and simultaneously the output signal Y and the output signal of the multiplier (III) inverted by an inverter (I) are supplied to an adder (III), in order to perform the corordinate transformation in accordance with the equation 14. In order to perform the coordinate transformation due to pitching, in accordance with the equation 15, the $\alpha$ is inverted by a inverter (II) and multiplied with a by a potentiometer (VIII) and the result is supplied to the adder (III). As to the coordinate transformation due to the yawing motion, in accordance with the equation 16, $\phi$ is inverted by an inverter (III) and multiplied with a by the potentiometer (IX) and the result is supplied to the adder (II). Consequently, applying these electric signals of X' and Y' to the systems shown in FIGS. 6, 7 and 8, it becomes possible to perform the coordinate transformations to display on the color TV monitor the changes in the environment pattern due to the changes in the attitude of the moving body and thereafter the same processes as those previously mentioned can be performed.

A method for composing and displaying other road environment patterns such as tunnels, cut-throughs and the entrance and exit of highway ramps etc., will be described.

Describing firstly the case of a tunnel such as shown in FIG. 11(A), the pattern of the interior of the tunnel such as shown in FIG. 11(B) is expressed mathematically. The line dividing left side of the road 18 in the tunnel interior from the left tunnel wall 19 is expressed by $$x = x_{t1} = [(R - D)/h]y \tag{17}$$

and the line on the right side $$x = x_{t2} = -(D/b)y \tag{18}$$

The line dividing the left side of the ceiling 20 from the tunnel wall is $$x = x_{T1} = [(R - D)/(H - h)]y \tag{19}$$

and the line on the right side is $$x = x_{T2} = [D/(H - h)]y \tag{20}$$

where H is the height of the ceiling from the road surface. Accordingly, the pattern regions of the tunnel interior are as follows:

road region in tunnel $x_{t1} < x < x_{t2}$ (21)
left side wall region $x < x_{t1}$, $x < x_{T1}$ (22)
right side wall region $x > x_{t2}$, $x > x_{T2}$ (23)
ceiling region $x_{T1} < x < x_{T2}$ (24)

Lamps 21 each of which has a length $d_o$ arranged at the top of both walls at fixed intervals $c_o$ appear on the lines dividing the ceiling 20 and the side walls 19 and are expressed by the equations 19 and 20. For the *n*th lamp counting forwardly from the automobile, the *y*-coordinate range within which the *n*th lamp appears is $$y_{1n} < y < y_{2n} \tag{25}$$

and $$y_{1n} = a(H - h)/[c + (n - 1)c_o + (n - 1)d_o + a] \tag{26}$$

$$y_{2n} = a(H - h)/[c + (n - 1)c_o + n \cdot d_o + a] \tag{27}$$

where *c* is the distance between the imaginary screen and the nearest lamp thereto.

The change of the pattern due to the movement of the automovile along the road at velocity V is put as $$c = \int_{c=c_o}^{c=-d_o} V dt = c_o - \int_{c=0}^{c=c_o+d_o} V dt \tag{28}$$

and thus it can be expressed by changing *c* in a range $0 \leqslant c \leqslant c_o + d_o$ periodically with time.

Where the entrance 16 of the tunnel is square as in FIG. 11(D), its equations are as follows;

the upper side $$y_E = (a/l_t)(H - h) \tag{29}$$

the lower side, $$y_e = -(a/l_t)h \tag{30}$$

the left side, and $$x_{E1} = -(a/l_t)(R - D) \tag{31}$$

the right side $$x_{E2} = t)D \tag{32}$$

Accordingly, the region within which the interior of the tunnel appears is as follows.

$$\left.\begin{array}{l} y_e < y < y_E \\ x_{E1} < x < x_{E2} \end{array}\right\} \tag{33}$$

The approaching of the tunnel entrance due to the movement of the moving body at velocity V can be expressed by putting $l_t$ in the equations 29 through 32 which is the distance between the entrance and the automobile as $$l_t = \int_{l_t=l_o}^{l_t=a} V dt \tag{34}$$

In the equation 34, $l_c$ is the distance between the automobile and a position at which the tunnel entrance appears initially on the color TV monitor and the value of $l_c$ is a certain finite value because the tunnel entrance can not be produced in analog circuits which will be described later when the tunnel is infinitely distant position.

The shape of the tunnel exit is also defined by the same equations as 29 through 32 but its production is delayed in time by $\tau$ from the production of the entrance. Accordingly $l_t$ in the equations 29 through 32 is replaced by $l'_t$ which defines the distance between the exit and the automobile and is defined as follows, $$l_t' = \int_{l_t'=l_0}^{l_t'=a} V dt \qquad (35)$$

and this integration is initiated with the delay $\tau$. Since the length of the tunnel is determined by the time $\tau$, the length of the suitably changing the time $\tau$.

The region within which the tunnel interior appears is outside the periphery of the tunnel exit, that is, $$y > y'_E \text{ or } y < y'_e \text{ or } x > x'_{E2} \text{ or } x < x'_{E1} \qquad (36)$$

A method for expressing mathematically the pattern of the mountain through which the tunnel passes will be described. It is assumed that the height of the mountain is represented by M and the length of the foot of the mountain on either side by A as shown in FIG. 11(C). Then the $x$-$y$ coordinates of a point $(x_m, y_m)$ on the slope is expressed by $$x = (a/l_t)\, x_m \qquad (37)$$

$$y = (a/l_t)\,(y_m - h) \approx (a/l_t)\, y_m \qquad (38)$$

and the equation of the slope is $$x_{m1} = (A/M)\,(y - [aM/l_t]) \qquad (39)$$

for the left side and $$x_{M2} = A/M\,(-y + [aM/l_t]) \qquad (40)$$

for the right side.

Accordingly, the region within which the mountain appears is $$x_{M1} < x < x_{M2}, \text{ and } y > -(a/l_t)h \qquad (41)$$

The approaching of the mountain due to the movement of the automobile at velocity V is achieved by putting $$l_t = \int_{l_t=l_0}^{l_t=a} V dt \qquad (42)$$

and using this in the equations 39 through 41.

FIGS. 12 through 15 show electronic circuits each comprising analog circuits and logic circuits combined with each other in accordance with the equations of the additional pattern for the tunnel. Using these electronic circuits, it is possible to combine the additional pattern to a portion of the fundamental pattern and display the composed pattern on the color TV monitor as shown in FIG. 11(A).

Figure 12:
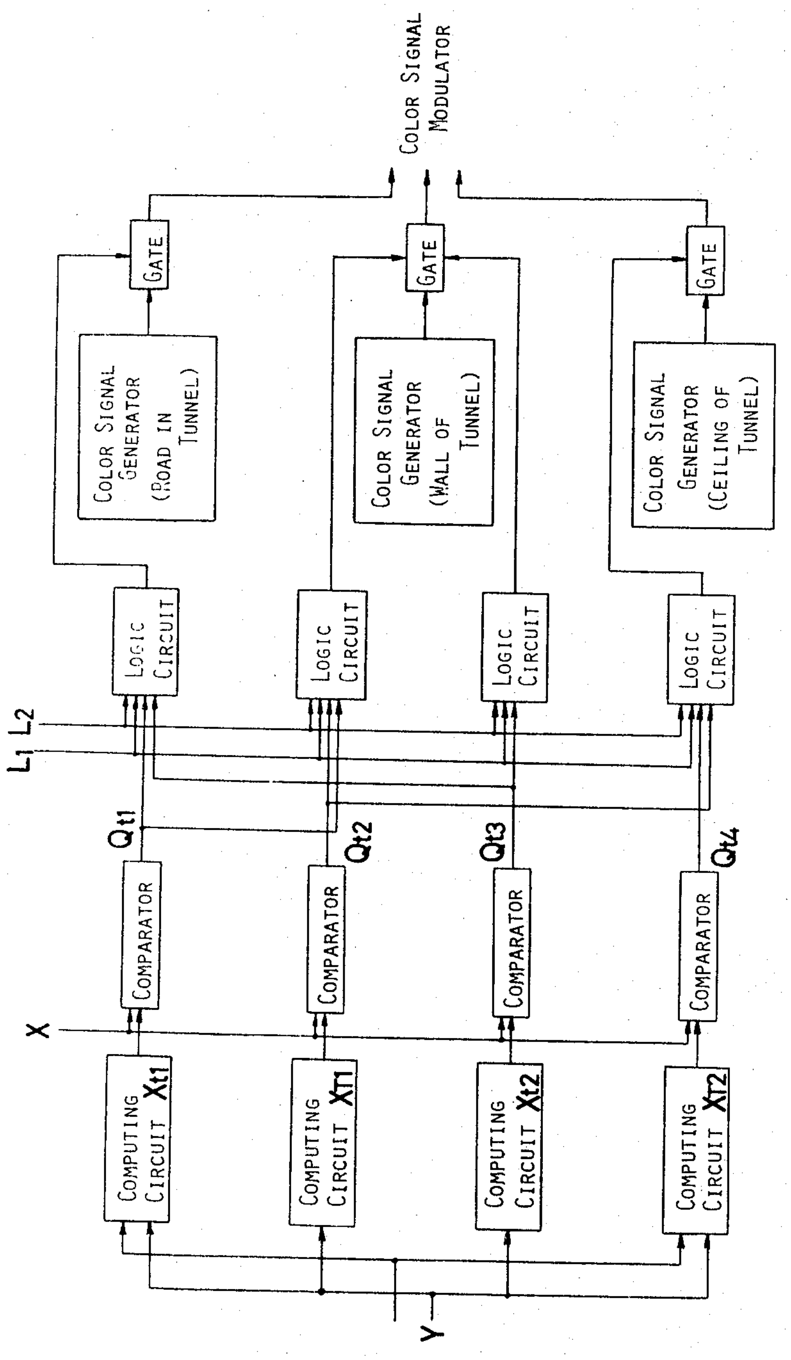
Figure 13:
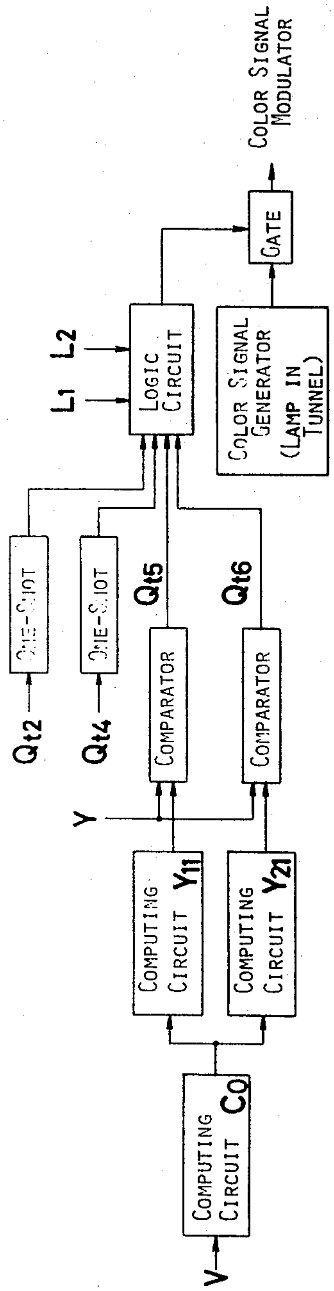
Figure 14A:
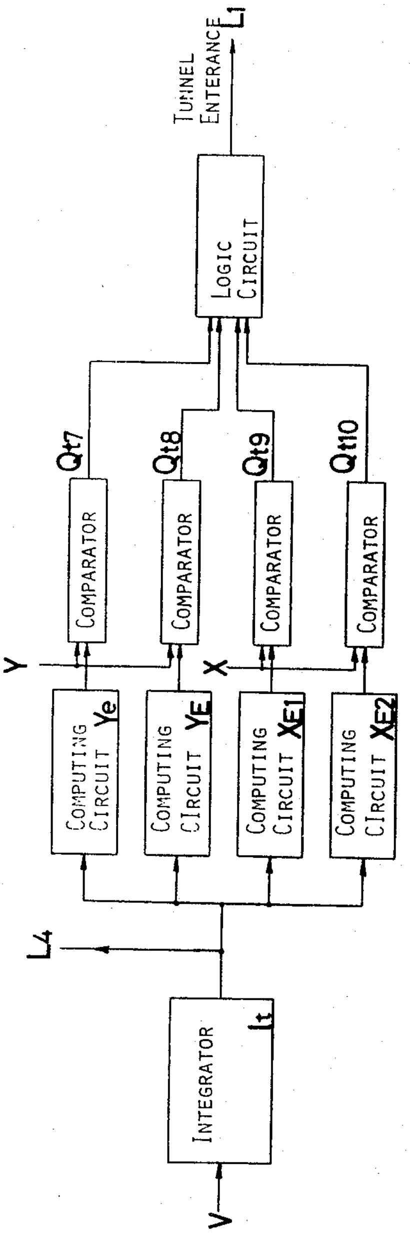
Figure 14B:
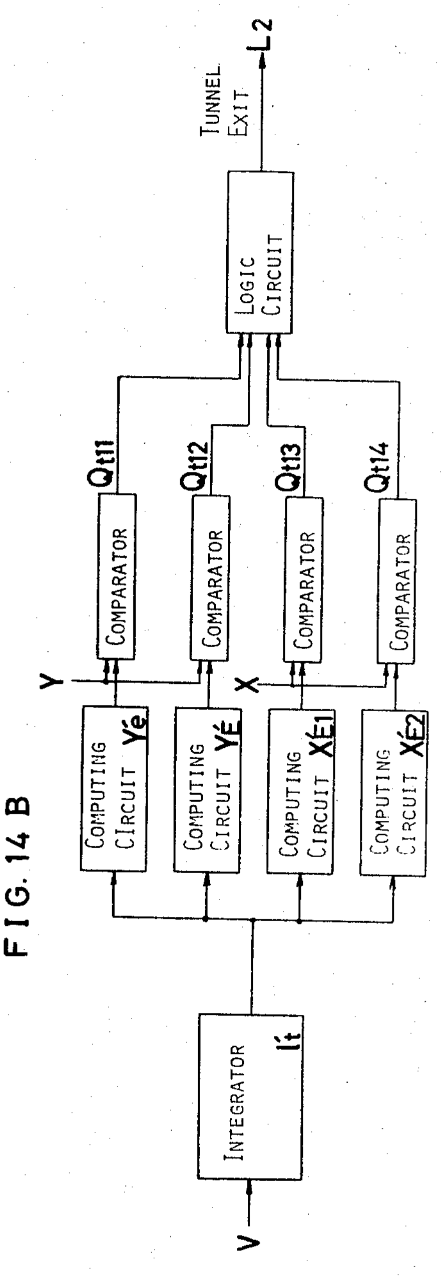

FIG. 12 shows an example of an electronic circuit for forming the road in the tunnel, the tunnel walls and the ceiling thereof, which circuits is constructed with analog circuits and logic circuit by combining them in accordance with the equations 17 through 24 and FIG. 13 shows an electronic circuit for forming the lamps in the tunnel which circuit is a combination of analog circuits and logic circuits in accordance with the equations 25 through 28, the output signals of these electronic circuits being fed to the color signal modulator in FIG. 6. FIG. 14(A) shows electronic circuits for providing the peripheries of the tunnel entrance and exit on the tunnel interior region composed by the circuit of FIG. 14(B) which circuits are constructed by combining analog circuits and logic circuits in accordance with the equations 29 through 35 and whose output signals $L_1$ and $L_2$ are fed to the respective logical product circuits for obtaining interior tunnel according with equation 34 and 35, and FIG. 15 shows an electronic circuit for providing the mountain region around the tunnel entrance which circuit is constructed by combining analog circuits and logic circuits in accordance with the equations 36 through 42 and whose output $L_3$ is fed through a gate to the color signal modulator and to the logical product circuit (I) in FIG. 6. In this manner, it is possible to produce a road pattern such as shown in FIG. 11(A) or 11(B).

The method for generating a pattern such as shown in FIG. 16(A) by composing and displaying the cut-through pattern will be described.

When the automobile moves toward the cut-through, the driver will see a road pattern such as shown in FIG. 16(B) and when the automobile is passing the cut-through the periphery of the entrance of the cut-through in the pattern which he will see disappears. When such perspectively represented pattern of the cut-through is to be displayed on the color TV monitor, it is impossible to provide a sufficient three-dimentional effect of the slopes of the banks of the cut-through by merely providing a mathematically represented pattern. In order to provide the sufficient three-dimensional effect, the color tones of the banks are not uniform but are gradated with the height thereof. That is, for example, the color of the slopes near the road surface is made dark green and lighter green is used for higher positions.

In order to produce the perspective pattern of the cut-through in the above manner, the respective regions of the pattern are first mathematically represented. As an example, it is assumed that the color gradation of the slope is made through three steps.

The boundary lines 23 and 24 of the colors on the left side slope 22 of the cut-through shown in FIG. 16(B) and the upper line 25 of the slope are represented as follows from the lowest line to the highest line, $$x_{11} = \frac{(R-D)+\dfrac{W}{3}}{h-\dfrac{Hk}{3}}\, y \qquad (43)$$

$$x_{12}=\frac{(R-D)+\frac{2}{3}-W}{h-\frac{2}{3}-H_k}y \quad (44)$$

$$x_{13}=\left\{[(R-D)+W]/(h-H_k)\right\}y \quad (45)$$

and the lines 27 – 29 for the right side slope 26 are as follows;

$$x_{21}=\frac{D+\frac{W}{3}}{h-\frac{H_k}{3}}y \quad (46)$$

$$x_{22}=\frac{D+\frac{2}{3}W}{h-\frac{2}{3}H_k}y \quad (47)$$

$$x_{23}=[(D+W)/(h-H_k)]y \quad (48)$$

where $H_k$ is the total height of the slope and $W$ is the depth of the slope.

As shown in FIG. 16(B), the periphery of the cross section of the entrance 30 of the cut-through is represented by $$x_{k1}=-(W/H_k)y+(a/l_b)[(W/H_k)h+(R-D)] \quad (49)$$

for the left side and $$x_{k2}=(W/H_k)y+(a/l_b)[(W/H_k)h+(R-D)] \quad (50)$$

for the right side, where $l_b$ is the distance between the driver and the entrance of the cut-through and in defined, when the automobile moves along the road at the velocity V, by the equation $$l_b=\int_{l_b=l_o}^{l_b=a} V dt \quad (51)$$

The periphery of the exit 31 of the cut-through is also represented by the same equations as 49 and 50 except for the use of coordinates $x'_{k1}$ and $x'_{k2}$. However, the distance $l_e$ between the exit and the driver is different from the distance $l_b$ and the its production is delayed by a certain time by which the length of the cut-through is determined. The distance $l_e$ is defined by a similar equation to (52), which is as follows;

$$l_e=\int_{l_e=l_c}^{l_e=a} V dt \quad (52)$$

The boundary lines 33 – 36 of the colors along the height of plateaus 32 which are positioned away from the both sides of the cut-through are represented from the lowest line as follows;

$$y_{k1}=-(a/l_b)h \quad (53)$$

$$y_{k2}=-(a/l_b)(h-[H_k)/3] \quad (54)$$

$$y_{k3}=-(a/l_b)(h-[2H_k/3]) \quad (55)$$

$$y_{k4}=-(a/l_b)(h-H_k) \quad (56)$$

Accordingly, the regions defined by the respective lines represented by the equations 43 to 56 in the pattern of the cut-through are as follows:

the lower region of the left slope
$x < x_{11}$, $x < x_1$ and $x_{k1} < x < x'_{k1}$ (57)

the middle region of the same
$x_{11} < x < x_{12}$ and $x_{k1} < x < x'_{k1}$ (58)

the upper region of the same
$x_{12} < x < x_{13}$ and $x_{k1} < x < x'_{k1}$ (59)

the lower region of the right slope
$x_2 < x$, $x_{21} < x$ and $x'_{k2} < x < x_{k2}$ (60)

the middle of the same
$x_{22} < x < x_{21}$ and $x'_{k2} < x < x_{k2}$ (61)

the upper of the same
$x_{23} < x < x_{12}$ and $x'_{k2} < x < x_{k2}$ (62)

the lower region of the plateau at the left side of the cut-through entrance
$y_{k1} < y < y_{k2}$ and $x < x_{k1}$ (63)

the middle of the same
$y_{k1} < y < y_{k3}$ and $x < x_{k2}$ (64)

the upper of the same
$y_{k3} < y < y_{k4}$ and $x < x_{k1}$ (65)

the lower region of the right hand plateau of the cut-through entrance
$y_{k1} < y < y_{k2}$ and $x_{k2} < x$ (66)

the middle of the same
$y_{k2} < y < y_{k3}$ and $x_{k2} < x$ (67)

the upper of the same
$y_{k3} < y < y_{k4}$ and $x_{k2} < x$ (68)

A method for producing the road pattern composed spatially with the cut-through thus represented will be explained with reference to FIG. 17.

In this method, the $x$-$y$ coordinates on the screen represented by a voltage values as a time function obtained from the previously described integrators (I) and (II) and the electric signal D representative of the lateral deviation of the automobile are used. The operation of the equation 43 is performed by an computing circuit for $X_{11}$ which is a combination of analog circuits in accordance with the equation 43.

The result of the computing is compared in a comparator with a voltage value representative of the $x$-coordinate and the comparator provide an output signal $Q_{k1}$ which is 1 when $X > X_{11}$ and 0 when $X < X_{11}$. In a similar manner, the computing of the equations 44 – 56 are performed by the respective computing circuits which are of combinations of analog circuits and the comparisons of X and Y are made in the comparator to obtain $Q_{k2} \sim Q_{k14}$.

Then a pulse signal having width corresponding to the region defined by the equation 57 is obtained from a logic circuit by using the previously mentioned $Q_2$ in FIG. 6 and the $Q_{k1}$, $Q_{k7}$ and $Q_{k9}$ thus obtained. This pulse signal drives the gate to control the color signal of dark green to thereby produce the pattern on a portion of the color TV monitor which corresponds to the region of the equation 57. Similarly, the pulses having widths corresponding to the regions of the equation 58 – 68 are provided from the respective logic circuits by using the $Q_{k1}$, $Q_{k14}$ and $Q_3$ to drive the respective gates to control the respective color signals to thereby create on the portions of the color TV monitor corresponding to the regions of the equations 58, 61 and 64 a dark green pattern, on the portions corresponding to the regions of the equations 56, 59, 62 and 65 a middle tone green pattern and on the portions corresponding to the regions of the equations 57, 60, 63 and 66 a light green pattern.

In order to produce the road pattern shown in FIG. 16(A) by combining the pattern of the cut-through thus obtained with the fundamental road pattern shown in FIG. 1, the blue sky region is defined by $$y > y_{k4},\ x_{13} < x < x_{23} \text{ or } x'_{k1} < x < x'_{k2} \text{ and } y \leq 0 \quad (69)$$

and the green area is defined by $$x < x_1 \text{ or } x > x_2 \text{ and } y < y_{k1},\ x'_{k1} < x < x_1 \text{ or } x_2 < x < x'_{k2} \text{ and } y < 0 \quad (70)$$

Accordingly, by modifying the circuit in FIG. 6 which is used for producing the previously mentioned fundamental road pattern in such a manner that a pulse having width corresponding to the region defined by the equation 69 is obtained by applying $Q_{k3}$, $Q_{k6}$, $Q_{k9}$, $Q_{k10}$ and $Q_{k14}$ to the logic circuit in the circuit of FIG. 3 for obtaining a pulse signal having width corresponding to the blue sky region, the blue sky region when the cut-through pattern is combined, can be created.

And by modifying it in such a manner that a pulse having width corresponding to the region defined by the equation 70 is obtained by applying $Q_{k9}$, $Q_{k10}$ and $Q_{k11}$ to the logic circuit for obtaining the pulse signal having width corresponding to the green region of FIG. 6, the green region when the cut-through pattern is combined can be produced with reference to FIGS. 18 and 19.

The method for producing the patterns of the ramp entrance and exit will be described.

Figure 18A:
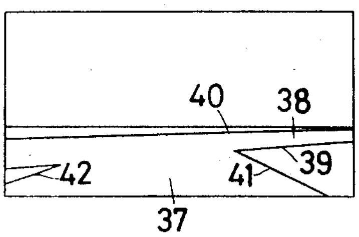

It is assumed that at the entrance of the ramp the entrance road 37 of the straight road and the main road 38 intersect with each other at an angle $\delta$ as shown in FIG. 19. In this case the equations defining the side lines 39 and 40 of the main road 38 in the pattern in FIG. 18(A) are represented by $$x_{r1} = -(y/h)[ah/\tan(\psi-\delta) \cdot (1/y) - (D + L/\tan\delta)\sin\delta/\sin(\psi-\delta)] \quad (71)$$

$$x_{r2} = -(y/h)[ah/\tan(\psi-\delta) \cdot (1/y) - (D + L/\tan\delta - R_o/\sin\delta)\sin\delta/\sin(\psi-\delta)] \quad (72)$$

and the side lines 41 and 42 of the entrance road 37 are as follows:

$$x_{r3} = -\frac{y}{h}\left\{\frac{ah}{\tan\left(\frac{\Pi}{2}-\psi\right)}\cdot\frac{1}{y} - \frac{R_{o-D}}{\cos\psi}\right\} \quad (73)$$

$$x_{r4} = -\frac{y}{h}\left\{\frac{ah}{\tan\left(\frac{\Pi}{2}-\psi\right)}\cdot\frac{1}{y} + \frac{D}{\cos\psi}\right\} \quad (74)$$

In the above equations, $R_o$ is the width of the entrance road and the main road, $\psi$ is the angle of the attitude of the automobile 46 and L is the distance between the driver's position and a point at which the entrance road and the main road intersect and varies with the movement of the automobile 46. The L is defined, when the velocity of the automobile is V, as follows:

$$L = L_o - \int_{L=0}^{L=L_o} V\,dt \quad (75)$$

where $L_o$ represents the length of the ramp entrance road.

Accordingly, the range of the entrance road 37 and the main road 38 is $$x_{r1} < x < x_{r2},\ y < 0 \text{ or}$$
$$x_{r3} < x < x_{r4},\ x < x_{r1},\ y < 0 \quad (76)$$

and the range of the green area is represented by $$x > x_{r2},\ y < 0 \text{ or}$$
$$x_{r4} < x < x_{r1},\ y < 0 \text{ or}$$
$$x_{r1} > x,\ x_{r3} > x,\ y < 0 \quad (77)$$

Figure 18B:
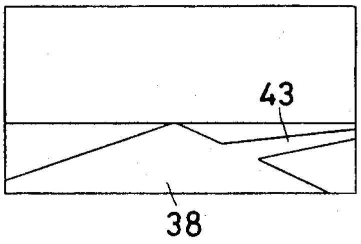
Figure 19A:
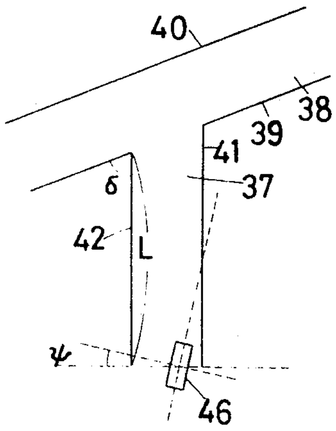
Figure 19B:
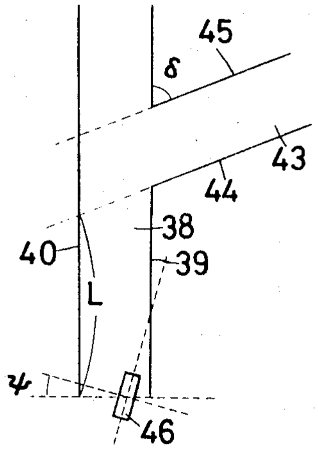

For the ramp exit, it is also assumed that the exit road 43 and the main road 38 intersect with each other at angle $\delta$. The equations of the side lines 39 and 40 of the main road 38 in the pattern of FIG. 18(B) are the same as the equations 73 and 74 for the ramp entrance and the side lines 44 and 45 of the exit road 43 are represented by the equation 71 and 72.

Accordingly, the ranges of the exit road and the main road are $$x_{r1} < x < x_{r2},\ x < x_{r3}\ y < 0$$
$$x_{r3} < x < x_{r4}\ y < 0 \quad (78)$$

and the ranges of the green areas are $$x > x_{r4}\ y < 0 \text{ or}$$
$$x_{r1} > x,\ x_{r3} > x\ y < 0 \text{ or}$$
$$x_{r3} > x > x_{r2}\ y < 0 \quad (79)$$

It should be noted that guard rails can be provided in the ramp entrance and ramp exit patterns thus represented as in the case of the fundamental road pattern.

The ramp entrance and exit and the fundamental road pattern may be connected with the ramp entrance and exit patterns are mated with the fundamental road pattern.

The ramp entrance and the ramp exit can be produced on the color TV monitor by using analog circuits and logic circuits combined in accordance with the respective equations as in the other previously mentioned cases and therefore the details of the circuits themselves are omitted.

As described in detail hereinbefore, the composing and displaying system for the environment patterns according to the present invention makes it possible to compose and display not only the changes in the complicated environment patterns but also the changes in the pattern due to the changes made by the moving body and provides a realistic feeling to the operator.

Accordingly, it can be used as the visual display devices of automobile, air plane and train simulators etc., or for other various animation systems.

A case where the present system is applied to an automobile simulator will now be described.

In driving the automobile, the driver must note continuously not only the road conditions extending forwardly but also the conditions rearwardly thereof with a rear-view mirror.

Referring to FIG. 20, in the display system for artificially produced forward environment patterns, the $x$-$y$ coordinates values on the imaginary screen are, as previously mentioned, converted to voltage values as a time function of tooth waves 51 and 52 by, supplying a square wave 47 synchronized with the horizontal synchronizing signal and a square wave 48 synchronized with the vertical synchronizing signal to integrators 49 and 50 respectively, and the voltage values 51 and 52 are supplied to the analog circuit and logic circuit 53.

The analog circuits and logic circuits 53 are combined in accordance with the aforementioned equations representative of the various environment patterns of the road and by supplying thereto the electric output signal obtained when the $x$-$y$ coordinates are converted by voltage values 51, 52 and the output signal obtain from a dynamic characteristic simulating device to be described later (lateral deviation D and velocity V), gates 54 of the color signal generators 55 corresponding to the color environment patterns are controlled so that the color signal pass through gates 56 and adder 57 to the color signal modulator 58 thus resulting in the production on the color TV monitor 59 of the changing forward road environment patterns.

With the exception of one point which will be taken up later, the environment patterns rearward of the automobile as reflected in the rear-view mirror can be produced on a portion of the color TV monitor screen in the same manner as in the production of the forward pattern previously mentioned.

Since the $x$-$y$ coordinates on the rear-view mirror must be transformed to time space $\tau_2$, $\tau_3$ in order to transfer it to the color TV monitor screen 59, an input square wave 60 synchronized with the horizontal synchronizing signal from the integrator 62 is delayed by $\tau_1$ from the rise time of the aforementioned horizontal synchronizing signal and has a time width $\tau_2$ and an input square wave 61 synchronized with the vertical synchronizing signal from the integrator 63 has a time width $\tau_3$. The input square waves are converted to voltage values 64 and 65 respectively in the integrators 62 and 63 as functions of time. At this time, among the input electric signals to be fed from the dynamic characteristics simulating device to the analog circuits and to logical circuit 66, the velocity V is inverted to −V although the lateral deviation D remains as it is.

As above mentioned, by modifying a portion of the input electric signals and using the rearward environment pattern composing device which is constructed in the same manner as in the forward environment pattern composing device, the respective color signals corresponding to the color distribution of the rearward road pattern reflected on the rear-view mirror can be fed through the adder 57 to the color signal modulator 58 and thus the rearward pattern 59′ can be produced on a portion of the color TV monitor screen 59. In this connection, the gate (56) is closed when the output of the electric signal from the rearward environment pattern composing device is supplied to the adder 57 so that the output signal from the forward environment pattern composing device corresponding to the portion 59′ of the monitor screen occupied by the rear-view mirror is not supplied to the adder.

The whole of the driving simulator system will be described with reference to FIG. 21. Firstly, a simulator cockpit 66 includes a driving wheel 67, an accelerator pedal 68 and a braking pedal 69 etc. as in the actual automobile cockpit and the driving operations of the driver, that is, the rotation angle of the driving wheel and the degree of depression of the accelerator pedal or the braking pedal are supplied to the dynamic characteristics simulating device 76 as electric signals. In front of the driver, a color TV monitor 70 is provided. As mentioned previously, the square wave synchronizing signals from the horizontal and vertical synchronizing signal generators are supplied to the forward and rearward environment pattern composing devices respectively to make them electric signals having time widths corresponding to the forward and rearward road environment patterns, respectively, and the electric signal having the forward road pattern information is fed to the adder 75 through the gate 74 while the electric signal having the rearward road pattern information is directly fed to the same adder 75 to obtain their sum so that both the road pattern extending forwardly and the pattern extending rearwardly which is reflected by the rear-view mirror are displayed on the color TV monitor 70.

The driver sits in the cockpit 66 and operates the controls noting the road patterns displayed on the color TV monitor 70. The electric signals corresponding to the controlling movements of the steering wheel, the accelerator pedal and the braking pedal are guided to the dynamic characteristics simulating device to preduce electric signals corresponding to the condition of the automobile, that is, the lateral deviation and the velocity thereof.

As to the dynamic characteristics simulating device, some mathematical models have been proposed for the studies of the steerability and stability of the automobile.

Although the present invention can use such models by simulating them with analog computer, the device itself for performing such models will become complicated and expensive. Accordingly, it is preferable to use a device such as follows.

Considering a case where the automobile to be simulated has an auto-transmission having no need of gear changing, the velocity V of the automobile is obtained by the following equation.

$$P(\theta_s) = A\,(dv/dt) + BV^2 + f(\beta) \tag{80}$$

Where $P(\theta_s)$ is the engine power depending upon the depression $\theta_s$ of the accelerator pedal and is known as $$P(\theta_s) = k_1\theta_s + k_2 \tag{81}$$

from engine mechanics, where $k_1$ and $k_2$ are constant. $BV^2$ represents the rolling friction and the air resistance of the wheels. $f(\beta)$ is the braking force expressed as a function of the depression of the braking pedal and the function itself is determined empirically.

From the equations 80 and 81, the velocity change of the automobile can be expressed as follows.

$$dv/dt = ([k_1/A]\theta_s + k_2/A) - (B/A)V^2 - (1)/A)\,f(\beta) \tag{82}$$

For the lateral deviation of the automobile, the turning angle $\psi_s$ of the automobile when the steering wheel is rotated by $\alpha_s$ is expressed, by using the geometrical model, as follows;

$$\psi_s = l_s \int \alpha_s V dt \tag{83}$$

where $l_s$ is a constant depending upon the gear ratio of the steering system and the distance between the forward wheel axle and rear wheel axle. The lateral deviation D is also expressed in approximation as follows:

$$D = \int \psi_s V dt \tag{84}$$

FIG. 22 shows an example of dynamic movement characteristics dimulating device for automobiles constructed in accordance with the above equations. In the same Figure, 77 is a block diagram of a mechanism for providing electric signals corresponding to the velocity V of the automobile in which the item $(1/A)f(\beta)$ concerning the braking force in the equation 82 is obtained by a function generator 79 and potentiometer 80 while the item $(B/A)V^2$ concerning the rolling friction and the air resistance in the equation 82 is obtained by a multiplier 85 and a potentiometer 86, both items are added in an adder 81 and the result is inverted in an inverter 83 to make $-(B/A)V^2 - (1/A)f(\beta)$ which is supplied to an adder-integrator 84. In addition to this $(k_1/A)\theta_s$ is produced by passing the depression $\theta_s$ of the accelerator through a potentiometer 87 and $(k_1/A)\theta_s$ thus obtained together with the constant $k_2/A$ is supplied to the adder integrator 84. The output of the adder-integrator 84 is one obtained by integrating the right side of the equation 82 and, hence, an electric signal corresponding to the velocity V.

Numeral 78 in FIG. 22 is a block diagram of a mechanism for providing an electric signal corresponding to the lateral deviation D of the automobile in which the operating angle $\alpha_s$ of the steering wheel and the previously obtained velocity V are multiplied in a multiplier 88. The output of the multiplier 88 is passed through a potentiometer 89 and integrated in the integrator 90 to obtain the turning angle $\psi_s$ in the equation 83. Then the angle $\psi_s$ and the velocity V are multiplied a multiplier 91 and the results of the multiplication is integrated in an integrator 92 to obtain an electric signal D corresponding to the lateral deviation of the automobile. By supplying the electric signals, thus obtained, corresponding to the velocity V and the lateral deviation D to the forward and rearward environment pattern composing devices 72 and 73 as their inputs respectively, it is possible to change the road pattern produced on the color TV monitor according to the driving condition of the automobile. That is, in accordance with the operations of the steering wheel, the accelerator pedal and/or the braking pedal, the relative changes of the road patterns extending forwardly and rearwardly of the automobile, the latter being reflected in the rear-view mirror, can be composed and displayed purely electronically.

As described in detail hereinbefore, the present invention makes it possible to display the various road condition patterns concerning a series of highways on a color TV monitor by displaying on the monitor firstly the entrance of the ramp and then the fundamental road pattern, by sequentially and spatially combining such other environment patterns as tunnels and cut-throughs of suitably selected length to the fundamental pattern in such a manner that, for example, a tunnel and mountain approaching from an infinitely remote position (in practice, from a finite distance) at a velocity corresponding to the velocity of the automobile, the entrance of a tunnel, the interior of a tunnel and the exit of a tunnel appear sequentially, by chaning these patterns upon their approach, by composing and displaying the patterns such that when the automobile enters the tunnel the interior of the tunnel is shown, when the automobile is moving through the tunnel the approaching of the tunnel exit and the fundamental patterns visible through the exit are shown and when it leaves the exit only the fundamental road pattern is shown, and finally by composing and displaying other patterns of suitable length belonging to the exit of the ramp.

Furthermore, since with this system the rearward environment patterns are also displayed simultaneously, the operator can operate the simulator as if he were in an automobile on an actual road.

The simulator described in detail hereinbefore is applicable not only to automobiles but also to airplanes, trains and ships etc. by modifying it within the spirit of the present invention.

We claim:

1. A method of electronically composing and displaying environmental patterns comprising the steps of converting $x$-$y$ coordinates on an imaginary screen to a voltage value as a function of time with reference to horizontal and vertical synchronizing signals, applying said voltage to an analog electronic circuit constructed in accordance with equations of the environment patterns when simplified, converting the output electric signals of said analog circuit to an electric signal having width corresponding to the spatial region, controlling respective color signal generators corresponding to the color distribution of the environment patterns in proportion to the width of said electric signal and producing the environment on a color TV monitor by feeding these color signals to the color TV monitor.

2. The method of electronically composing and displaying environment patterns set forth in claim 1, wherein the environment patterns are the patterns seen from a moving body and the parameters of said analog electronic circuit are controlled in accordance with the velocity of the moving body.

3. The method of electronically composing and displaying environment patterns set forth in claim 1, wherein the parameters of the analog electronic circuit are controlled in accordance with the lateral deviation of the moving body thereby producing changes in the environment patterns on the color TV monitor in accordance with the lateral deviation of the moving body.

4. The method of electronically composing and displaying environment patterns set forth in claim 1, wherein an analog electronic circuit is used for the coordinate transformation of the $x$-$y$ coordinates on the imaginary screen to coordinates corresponding to the changes in the environment pattern due to the change of attitude of the moving body.

5. A simulator system of an automobile comprising in combination, a simulator cockpit including a driving means, an accelerator pedal and a breaking pedal, a horizontal and vertical synchronizing signal generator for generating horizontal and vertical synchronizing signals, a dynamic characteristics simulating device operative upon the actuation of said driving means, said accelerator and said breaking pedal to generate electric signals representative of the velocity and the lateral deviation of the automobile, a forward environment pattern composing device adapted to receive the electric signals from said dynamic characteristics simulating device, said forward environment pattern composing device including integrators connected to the output of said synchronizing signal generator, a combined analog and digital circuit connected to the outputs of said integrators, a gate controlled by said analog and digital circuit and a color signal generator controlled by said gate, said analog and digital circuit including at least one computing circuit, at least one comparator and at least one logic circuit which are combined according to equations defining front patterns including a fundamental pattern and additional patterns to be combined therewith, a color signal modulator connected to the output of said gate, and a color TV monitor connected to the output of the color signal modulator for displaying the combined front patterns, said color TV monitor also connected to the output of said synchronizing signal generator, whereby the combined front pattern displayed on said color TV monitor varies according to the operation of said simulator cockpit.

6. A simulator system set forth in claim 5, further comprising a rearward environmental pattern composing device having second integrators, a second analog and digital circuit, a second gate and a second color signal generator for composing rearwardly extending patterns on a portion of said color TV monitor, said rearward environmental pattern composing device being connected to said dynamic characteristics simulating deivce and to said horizontal and vertical synchronizing signal generator and said second analog and digital circuit including at least one computing circuit, at least one comparator and at least one logic circuit which are combined according to equations defining rear patterns including a fundamental pattern and additional patterns to be combined therewith.

7. A simulator system set forth in claim 5, wherein said additional patterns include patterns for tunnels, cutthrough roads and ramps and are produced by a means including a combined analog and digital circuit, gate and color signal generator, said analog and digital circuit including at least one computing circuit, at least one comparator and at least one logic circuit which are combined according to equations defined for each respective additional pattern, and said additional patterns are combined with the fundamental pattern by said gate and the combined front patterns are displayed on said color TV monitor.

8. A simulator system set forth in claim 7, further comprising means for producing said additional pattern of a desired length by comparing an electric value preset for the desired length with an electric value corresponding to a distance obtained by integrating the velocity of the automobile over the time during which the automobile runs through the distance.

9. A simulator system set forth in claim 7, further comprising means for gradating the color of the additional pattern according to the relative regions thereof.

* * * * *